US012552902B2

(12) United States Patent
Sado et al.

(10) Patent No.: US 12,552,902 B2
(45) Date of Patent: Feb. 17, 2026

(54) COMPOSITION FOR OPTICAL MATERIAL

(71) Applicant: MITSUBISHI GAS CHEMICAL COMPANY, INC., Tokyo (JP)

(72) Inventors: Mariko Sado, Tokyo (JP); Kouhei Takemura, Tokyo (JP); Hiroshi Horikoshi, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 593 days.

(21) Appl. No.: 17/925,362

(22) PCT Filed: May 21, 2021

(86) PCT No.: PCT/JP2021/019376
§ 371 (c)(1),
(2) Date: Nov. 15, 2022

(87) PCT Pub. No.: WO2021/241441
PCT Pub. Date: Dec. 2, 2021

(65) Prior Publication Data
US 2023/0100848 A1 Mar. 30, 2023

(30) Foreign Application Priority Data
May 27, 2020 (JP) ................ 2020-092264

(51) Int. Cl.
*C08G 75/08* (2006.01)
*C08G 63/682* (2006.01)
*G02B 1/04* (2006.01)
*G02C 7/02* (2006.01)

(52) U.S. Cl.
CPC ........... *C08G 75/08* (2013.01); *C08G 63/682* (2013.01); *G02B 1/04* (2013.01); *G02C 7/022* (2013.01); *C08G 2261/3223* (2013.01)

(58) Field of Classification Search
CPC ............. C08G 75/08; C08G 63/682; C08G 2261/3223; G02B 1/04; G02C 7/022; C08L 81/00
See application file for complete search history.

(56) References Cited

U.S. PATENT DOCUMENTS

| 6,117,923 | A | 9/2000 | Amagai et al. |
| 2003/0171533 | A1 | 9/2003 | Tamura et al. |
| 2009/0018308 | A1 | 1/2009 | Kamura et al. |
| 2015/0028270 | A1 | 1/2015 | Tanaka et al. |
| 2017/0022350 | A1* | 1/2017 | Fueldner .............. C09J 5/00 |
| 2018/0265638 | A1* | 9/2018 | Namiki ............ C08G 75/06 |

FOREIGN PATENT DOCUMENTS

| JP | 9-110979 A | 4/1997 |
| JP | 10-298287 A | 11/1998 |
| JP | 2001-2783 A | 1/2001 |
| JP | 2002-332350 A | 11/2002 |
| JP | 2004-137481 A | 5/2004 |
| JP | 2010-242093 A | 10/2010 |
| JP | 2013-100534 A | 5/2013 |
| JP | 2017-114972 A | 6/2017 |
| WO | 2013/133144 A1 | 9/2013 |

OTHER PUBLICATIONS

Vo, C. et al., "Combination of Episulfide Ring-Opening Polymerization With ATRP for the Preparation of Amphiphilic Block Copolymers", Macromolecular, Rapid Communication, 2013, pp. 156-162.

Wang, L. et al., "Avoiding Disulfides: Improvement of Initiation and End-Capping Reactions in the Synthesis of Polysulfide Block Copolymers", Macromolecular, Chemistry and Physics, 2009, pp. 447-456.

International Search Report and Written Opinion of the International Searching Authority issued in International Patent Application No. PCT/JP2021/019376, dated Jul. 20, 2021, along with an English translation thereof.

International Preliminary Report on Patentability issued in International Patent Application No. PCT/JP2021/019376, dated Nov. 17, 2022, along with an English translation thereof.

* cited by examiner

*Primary Examiner* — Shane Fang
(74) *Attorney, Agent, or Firm* — Greenblum & Bernstein, P.L.C.

(57) ABSTRACT

A composition for an optical material contains (a) an episulfide compound, (b) a polymerization catalyst, and (c) an ester compound having a halogen at the α position. The (c) ester compound having a halogen at the α position is preferably at least one compound selected from the group consisting of dimethyl chloromalonate, diethyl chloromalonate, dimethyl bromomalonate, and diethyl bromomalonate.

7 Claims, No Drawings

COMPOSITION FOR OPTICAL MATERIAL

TECHNICAL FIELD

The present invention relates to a composition for optical materials, etc., and particularly relates to a composition for optical materials suitable for optical materials for a plastic lens, a prism, an optical fiber, an information recording substrate, a filter or the like, in particular for a plastic lens, and the like.

BACKGROUND ART

Plastic materials are lightweight, highly tough and easy to be dyed, and therefore are widely used recently for various types of optical materials, particularly eyeglass lenses. Optical materials, particularly eyeglass lenses, are specifically required to have, as physical properties, low specific gravity, high transparency and low yellowness, high heat resistance, high strength and the like, and as optical properties, high refractive index and high Abbe number. A high refractive index allows a lens to be thinner, and a high Abbe number reduces the chromatic aberration of a lens. However, as the refractive index is increased, the Abbe number is decreased. Therefore, it has been studied to improve both of the refractive index and the Abbe number. Among methods which have been proposed, the most representative method is a method using an episulfide compound as described in Patent Document 1.

Moreover, for improving oxidation resistance, a composition obtained by adding a thiol compound to an episulfide compound has been proposed in Patent Document 2.

Furthermore, it has been studied to achieve a high refractive index, and compositions consisting of sulfur, episulfide and thiol described in Patent Documents 3 and 4 and a composition consisting of a compound having a cyclic skeleton and episulfide described in Patent Document 5 have been proposed.

As described above, an episulfide compound can be polymerized solely or with many other compounds because of its high reactivity, and can be used for preparing compositions according to various applications.

However, the viscosity of such an episulfide compound or composition containing the same may increase at the time of compounding, and there is a problem with respect to workability. In order to cope with this, the technique for the addition of a halide of an element belonging to the groups 13-16 in the long-period periodic table described in Patent Document 6 has been proposed.

However, even when these techniques are employed, any of coloring of a resin, change in color tone of a resin after heating and change in color tone of a resin after light irradiation may be deteriorated, and it is difficult to keep a good balance between these physical properties. Accordingly, it has been desired to develop a technique of suppressing an increase in the viscosity at the time of compounding and keeping a good balance between coloring of a resin after curing, change in color tone of a resin after heating and change in color tone of a resin after light irradiation.

PRIOR ART DOCUMENTS

Patent Documents

Patent Document 1: Japanese Laid-Open Patent Publication No. H09-110979
Patent Document 2: Japanese Laid-Open Patent Publication No. H10-298287
Patent Document 3: Japanese Laid-Open Patent Publication No. 2001-2783
Patent Document 4: Japanese Laid-Open Patent Publication No. 2004-137481
Patent Document 5: Japanese Laid-Open Patent Publication No. 2010-242093
Patent Document 6: Japanese Laid-Open Patent Publication No. 2002-332350

SUMMARY OF THE INVENTION

Problems to be Solved by the Invention

The problem to be solved by the present invention is to provide a composition for optical materials, wherein it is possible to suppress an increase in the viscosity at the time of compounding and to keep a good balance between coloring of a resin after curing, change in color tone of a resin after heating and change in color tone of a resin after light irradiation, etc.

Means for Solving the Problems

In consideration of such circumstances, the present inventors diligently made researches and solved the problem with a composition for optical materials containing an episulfide compound (a), a polymerization catalyst (b) and an ester compound having a halogen at the α position (c), and thus arrived at the present invention.

Specifically, the present invention is as described below.

1. A composition for optical materials containing an episulfide compound (a), a polymerization catalyst (b), and an ester compound having a halogen at the α position (c).
2. The composition for optical materials according to item 1, wherein the episulfide compound (a) is a compound represented by formula (1):

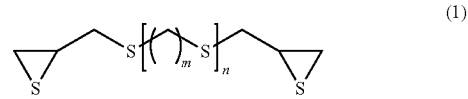

wherein: m represents an integer of 0 to 4; and n represents an integer of 0 to 2.

3. The composition for optical materials according to item 1 or 2, which further contains a polythiol compound.
4. The composition for optical materials according to any one of items 1 to 3, which further contains sulfur and/or a compound represented by formula (9):

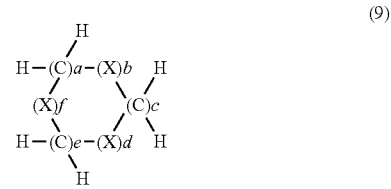

wherein: X represents S, Se or Te; a to f=0 to 3; 8≥(a+c+e)≥1; 8≥(b+d+f)≥2; and (b+d+f)≥(a+c+e).

5. The composition for optical materials according to any one of items 1 to 4, wherein the ester compound having a halogen at the α position (c) is a compound represented by formula (10):

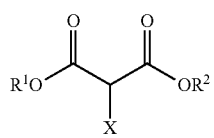

wherein: X represents a halogen; and $R^1$ and $R^2$ each independently represent a hydrocarbon having 1 to 10 carbon atoms.

6. The composition for optical materials according to item 5, wherein the compound represented by formula (10) is at least one compound selected from the group consisting of dimethyl chloromalonate, diethyl chloromalonate, dimethyl bromomalonate and diethyl bromomalonate.

7. An optical material obtained by polymerizing the composition for optical materials according to any one of items 1 to 6.

Advantageous Effect of the Invention

According to the present invention, it is possible to provide a composition for optical materials, wherein it is possible to suppress an increase in the viscosity at the time of compounding and to keep a good balance between coloring of a resin after curing, change in color tone of a resin after heating and change in color tone of a resin after light irradiation, etc., which were difficult to be carried out by conventional techniques.

EMBODIMENTS FOR CARRYING OUT THE INVENTION

Hereinafter, the present invention will be described in detail by way of production examples, working examples, etc., but the present invention is not limited thereto and can be arbitrarily changed and then practiced within a range not departing from the gist of the present invention.

The episulfide compound (a) to be used in the present invention includes all episulfide compounds. Specific examples of the episulfide compound (a) are classified into a compound having a chain aliphatic skeleton, a compound having an aliphatic cyclic skeleton and a compound having an aromatic skeleton and listed below.

Examples of the compound having a chain aliphatic skeleton include a compound represented by formula (1), (2), (3) or (4) below.

In formula (1), m represents an integer of 0 to 4, and n represents an integer of 0 to 2. Preferably, n represents 0.

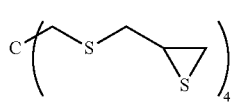

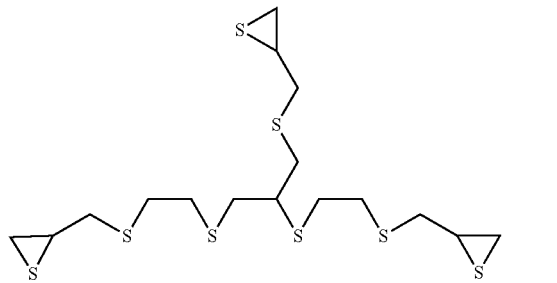

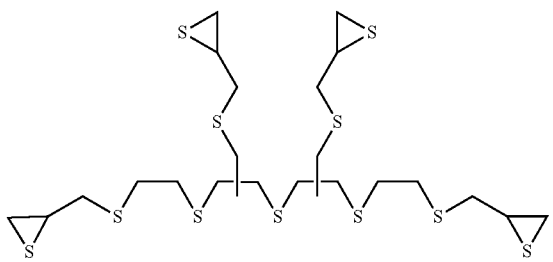

Examples of the compound having an aliphatic cyclic skeleton include a compound represented by formula (5) or (6) below.

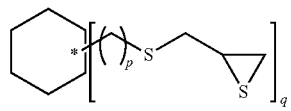

In formula (5), p and q each independently represent an integer of 0 to 4. Preferably, p represents 1 and q represents 2.

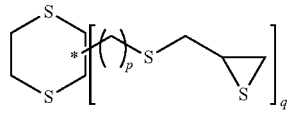

In formula (6), p and q each independently represent an integer of 0 to 4. Preferably, p represents 1 and q represents 2.

Examples of the compound having an aromatic skeleton include a compound represented by formula (7) or (8) below.

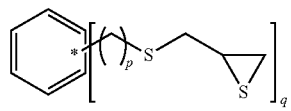

In formula (7), p represents an integer of 0 to 4, and q represents an integer of 1 to 3. Preferably, p represents 1 and q represents 2.

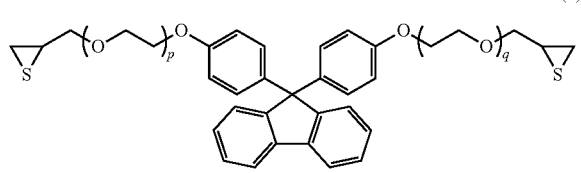

(8)

In formula (8), p and q each independently represent an integer of 0 or 1. Preferably, p represents 1 and q represents 1.

Specific examples of the compound (a) are described above, but the compound (a) of the present invention is not limited thereto. Further, as the compound (a), these compounds may be used solely, or two or more of them may be used as a mixture.

Among them, preferred are compounds having a chain aliphatic skeleton represented by formula (1) or (2) above, and specifically, these are bis(β-epithiopropyl)sulfide, bis(β-epithiopropyl)disulfide, bis(β-epithiopropyl)trisulfide, bis (β-epithiopropylthio)methane, 1,2-bis(β-epithiopropylthio) ethane, 1,3-bis epithiopropylthio)propane, 1,4-bis(β-epithiopropylthio)butane, bis(β-epithiopropylthioethyl) sulfide, and a compound of formula (2). Particularly preferred compounds are bis(β-epithiopropyl)sulfide (n=0 in formula (1) above), bis(β-epithiopropyl)disulfide (m=0 and n=1 in formula (1) above) and a compound of formula (2), and the most preferred compound is bis(β-epithiopropyl) sulfide (n=0 in formula (1) above).

As the polymerization catalyst (b) for polymerizing and curing the composition in the present invention, amines, onium salts, phosphine compounds, etc. may be used. Specific examples thereof include amines, quaternary ammonium salts, quaternary phosphonium salts, tertiary sulfonium salts, secondary iodonium salts and phosphine compounds. Among them, quaternary ammonium salts, quaternary phosphonium salts and phosphine compounds, which have good compatibility with the composition, are more preferred, and quaternary phosphonium salts are even more preferred. Specific examples of more preferred compounds include: quaternary ammonium salts such as tetra-n-butylammonium bromide, tetraphenylammonium bromide, triethylbenzyl ammonium chloride, cetyldimethylbenzyl ammonium chloride and 1-n-dodecylpyridinium chloride; quaternary phosphonium salts such as tetra-n-butylphosphonium bromide and tetraphenyl phosphonium bromide; and phosphine compounds such as triphenylphosphine. Among them, even more preferred compounds are triethylbenzyl ammonium chloride and tetra-n-butylphosphonium bromide, and the most preferred compound is triethylbenzyl ammonium chloride. As the polymerization catalyst, these compounds may be used solely, or two or more of them may be used as a mixture.

The amount of the polymerization catalyst (b) to be added cannot be determined categorically because it varies depending on the components of the composition, the mixing ratio and the method for polymerization and curing, but the amount is usually 0.001% by mass to 5% by mass, preferably 0.01% by mass to 1% by mass, and most preferably 0.01% by mass to 0.5% by mass relative to the total amount of the composition for optical materials. When the amount of the polymerization catalyst to be added is more than 5% by mass, the refractive index and heat resistance of a cured product may be reduced and coloring may occur. When the amount is less than 0.001% by mass, curing may be performed insufficiently and heat resistance may be insufficient.

The ester compound having a halogen at the α position (c) to be used in the present invention includes all ester compounds having a halogen at the α position, but is preferably a compound represented by formula (10).

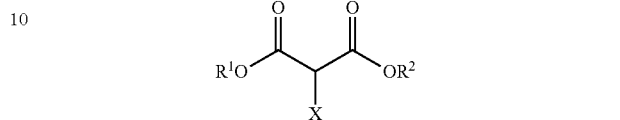

(10)

In formula (10): X represents a halogen, and preferably represents Cl, Br or I; and $R^1$ and $R^2$ each independently represent a hydrocarbon having 1 to 10 carbon atoms, preferably represent a hydrocarbon having 1 to 4 carbon atoms, and more preferably represent methyl, ethyl or propyl.

Specifically, the compound is a halogenated malonic acid ester, and more preferably a diester compound having a halogen at the α position. Specific examples thereof include dimethyl chloromalonate, diethyl chloromalonate, dimethyl bromomalonate and diethyl bromomalonate. Among them, dimethyl chloromalonate and diethyl chloromalonate are preferred.

The amount of the compound (c) to be added is usually 0.0001 to 5.0% by mass, preferably 0.0005 to 3.0% by mass, and more preferably 0.001 to 2.0% by mass relative to the total amount of the composition for optical materials. When the amount of the compound (c) to be added is more than 5.0% by mass, curing may be performed insufficiently and the refractive index and heat resistance of a cured product may be reduced. When the amount is less than 0.0001% by mass, the viscosity may increase at the time of compounding.

Note that a polythiol compound may be added to the composition for optical materials of the present invention. The polythiol compound includes all polythiol compounds, and specific examples thereof include methanedithiol, 1,2-dimercaptoethane, 2,2-dimercaptopropane, 1,3-dimercaptopropane, 1,2,3-trimercaptopropane, 1,4-dimercaptobutane, 1,6-dimercaptohexane, bis(2-mercaptoethyl)sulfide, 1,2-bis (2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptopropane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis(mercaptomethyl)methane, 4,8-dimercaptomethyl-1, 11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, ethyleneglycolbis(2-mercapto acetate), ethyleneglycolbis(3-mercaptopropionate), 1,4-butanediolbis(2-mercapto acetate), 1,4-butanediolbis(3-mercaptopropionate), trimethylolpropanetris(2-mercapto acetate), trimethylolpropanetris (3-mercaptopropionate), pentaerythritoltetrakis(2-mercaptoacetate), pentaerythritoltetrakis(3-mercaptopropionate), 1,1-dimercaptocyclohexane, 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-bis(mercaptomethyl)-1,4-dithiane, 2,5-bis(mercaptoethyl)-1,4-dithiane, 1,2-bis(mercaptomethyl)benzene, 1,3-bis(mercaptomethyl)benzene, 1,4-bis(mercaptomethyl)benzene, bis(4-mercaptophenyl)sulfide, bis(4-mercaptophenyl)ether, 2,2-bis(4-mercaptophenyl)propane, bis(4-mercaptomethylphenyl)sulfide, bis(4-mercaptomethylphenyl)ether and 2,2-bis(4-mercaptomethylphenyl)propane.

Specific examples of the polythiol compound are described above, but the polythiol compound is not limited thereto. Further, as the polythiol compound, these compounds may be used solely, or two or more of them may be used as a mixture.

Among the above-described compounds, specific examples of preferred compounds include bis(2-mercaptoethyl)sulfide, pentaerythritoltetrakis(2-mercaptoacetate), pentaerythritoltetrakis(3-mercaptopropionate), 2,5-bis(mercaptomethyl)-1,4-dithiane, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, 1,3-bis(mercaptomethyl)benzene and 1,4-bis(mercaptomethyl)benzene. Specific examples of more preferred compounds include bis(2-mercaptoethyl)sulfide and 1,3-bis(mercaptomethyl)benzene, and the most preferred compound is bis(2-mercaptoethyl)sulfide.

The amount of the polythiol compound to be added is preferably 1 to 50% by mass, more preferably 2 to 30% by mass, and even more preferably 3 to 20% by mass relative to the total amount of the composition for optical materials.

Note that sulfur and a compound represented by formula (9) may be added to the composition for optical materials of the present invention.

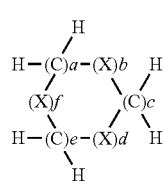

(9)

In formula (9): X represents S, Se or Te, and preferably represents S; a to f each independently represent an integer of 0 to 3; 8≥(a+c+e)≥1; 8≥(b+d+f)≥2; and (b+d+f)≥(a+c+e).

The compound represented by formula (9) includes all compounds, and specific examples thereof include dithiirane, 1,2-dithietane, 1,3-dithietane, trithietane, 1,2-dithiolane, 1,3-dithiolane, 1,2,3-trithiolane, 1,2,4-trithiolane, tetrathiolane, 1,2-dithiane, 1,3-dithiane, 1,4-dithiane, 1,2,3-trithiane, 1,2,4-trithiane, 1,3,5-trithiane, 1,2,3,4-tetrathiane, 1,2,4,5-tetrathiane, bis(1,2,3,5,6-pentathiepano)methane, tris(1,2,3,5,6-pentathiepano)methane, 1,2-dithiepane, 1,3-dithiepane, 1,4-dithiepane, 1,2,3-trithiepane, 1,2,4-trithiepane, 1,2,5-trithiepane, 1,3,5-trithiepane, 1,2,3,4-tetrathiepane, 1,2,3,5-tetrathiepane, 1,2,4,5-tetrathiepane, 1,2,4,6-tetrathiepane, 1,2,3,4,5-pentathiepane, 1,2,3,4,6-pentathiepane, 1,2,3,5,6-pentathiepane, hexathiepane, diselecyclobutane, triselecyclobutane, diselecyclopentane, triselecyclopentane, tetraselecyclopentane, diselecyclohexane, triselecyclohexane, tetraselecyclohexane, pentaselecyclohexane, diselecycloheptane, triselecycloheptane, tetraselecycloheptane, pentaselecycloheptane, hexaselecycloheptane, ditellurocyclobutane, tritellurocyclobutane, ditellurocyclopentane, tritellurocyclopentane, tetratellurocyclopentane, ditellurocyclohexane, tritellurocyclohexane, tetratellurocyclohexane, pentatellurocyclohexane, ditellurocycloheptane, tritellurocycloheptane, tetratellurocycloheptane, pentatellurocycloheptane and hexatellurocycloheptane.

Preferred specific examples thereof include 1,2-dithietane, trithietane, 1,2-dithiolane, 1,2,3-trithiolane, 1,2,4-trithiolane, tetrathiolane, 1,2-dithiane, 1,2,3-trithiane, 1,2,4-trithiane, 1,3,5-trithiane, 1,2,3,4-tetrathiane, 1,2,4,5-tetrathiane, pentathiane, 1,2,3-trithiepane, 1,2,4-trithiepane, 1,2,5-trithiepane, 1,2,3,4-tetrathiepane, 1,2,3,5-tetrathiepane, 1,2,4,5-tetrathiepane, 1,2,4,6-tetrathiepane, 1,2,3,4,5-pentathiepane, 1,2,3,4,6-pentathiepane, 1,2,3,5,6-pentathiepane and hexathiepane, and particularly preferred is 1,2,3,5,6-pentathiepane.

When using sulfur and the compound represented by formula (9), it is preferred that these are preliminarily reacted with the compound (a) in advance. Conditions for the preliminary polymerization reaction are preferably −10° C. to 120° C. and 0.1 to 240 hours, more preferably 0 to 100° C. and 0.1 to 120 hours, and particularly preferably 20 to 80° C. and 0.1 to 60 hours. It is effective to use a catalyst for promoting the preliminary reaction, and preferred examples of the catalyst include 2-mercapto-1-methylimidazole, triphenylphosphine, 3,5-dimethylpyrazole, N-cyclohexyl-2-benzothiazolylsulfinamide, dipentamethylene thiuramtetrasulfide, tetrabutyl thiuram disulfide, tetraethyl thiuram disulfide, 1,2,3-triphenylguanidine, 1,3-diphenylguanidine, 1,1,3,3-tetramethyleneguanidine, aminoguanidineurea, trimethylthiourea, tetraethylthiourea, dimethylethylthiourea, zinc dibutyldithiocarbamate, zinc dibenzyldithiocarbamate, zinc diethyldithiocarbamate, zinc dimethyldithiocarbamate and pipecorium pipecolyldithiocarbamate. Moreover, it is preferred that 10% or more of sulfur and the compound represented by formula (9) are consumed by this preliminary polymerization reaction (when the amount before the reaction is regarded as 100%), and it is more preferred that 20% or more of them are consumed thereby. The preliminary reaction may be performed in any atmosphere, for example, under inert gas such as air, nitrogen or the like, in a sealed state under normal pressure or raised or reduced pressure, or the like. In order to detect how much the preliminary reaction has proceeded, liquid chromatography or a refractometer can be used.

The amount of sulfur and the compound represented by formula (9) to be added is usually 0.01 to 40% by mass, preferably 0.1 to 30% by mass, and more preferably 0.5 to 25% by mass relative to the total amount of the composition for optical materials.

In the present invention, the composition for optical materials is preferably subjected to the deaeration treatment in advance. The deaeration treatment is carried out under reduced pressure before, during or after mixing a compound which can react with a part or all of the components of the composition, a polymerization catalyst and an additive. Preferably, the deaeration treatment is carried out under reduced pressure during or after mixing. The treatment conditions are as follows: under a reduced pressure of 0.001 to 50 torr; 1 minute to 24 hours; and 0° C. to 100° C. The degree of pressure reduction is preferably 0.005 to 25 torr, and more preferably 0.01 to 10 torr. The degree of pressure reduction may be varied within these ranges. The deaeration time is preferably 5 minutes to 18 hours, and more preferably 10 minutes to 12 hours. The temperature at the time of deaeration is preferably 5° C. to 80° C., and more preferably 10° C. to 60° C. The temperature may be varied within these ranges. The operation of renewing the interface of the composition for optical materials by means of stirring, blowing a gas, vibration caused by ultrasonic wave or the like during the deaeration treatment is preferable in terms of the enhancement of the deaeration effect. Components removed by the deaeration treatment are mainly dissolved gases such as hydrogen sulfide, low-boiling substances such as low-molecular-weight thiol, etc., but the type of components to be removed is not particularly limited as long as the effects of the present invention are exerted.

In addition, the operation of filtering impurities, etc. in these composition for optical materials and/or respective raw materials before mixing by using a filter having a pore diameter of about 0.05 to 10 μm for purification is preferable in terms of further improving the quality of the optical material of the present invention.

Further, at the time of obtaining an optical material by polymerizing and curing the composition for optical materials of the present invention, it is surely possible to add publicly-known additives such as an antioxidant, an ultraviolet absorber and a blueing agent to further improve practicability of the material obtained.

Preferred examples of the antioxidant include phenol derivatives. Among them, polyhydric phenols and halogen-substituted phenols are preferred compounds, and catechol, pyrogallol and alkyl-substituted catechols are more preferred compounds, and catechol and pyrogallol are the most preferred compounds. Preferred examples of the ultraviolet absorber include benzotriazole-based compounds, and specific examples of particularly preferred compounds include 2-(2-hydroxy-5-methylphenyl)-2H-benzotriazole, 5-chloro-2-(3,5-di-tert-butyl-2-hydroxyphenyl)-2H-benzotriazole, 2-(3-tert-butyl-2-hydroxy-5-methylphenyl)-5-chloro-2H-benzotriazole, 2-(3,5-di-tert-pentyl-2-hydroxyphenyl)-2H-benzotriazole, 2-(3,5-di-tert-butyl-2-hydroxyphenyl)-2H-benzotriazole, 2-(2-hydroxy-4-octyloxyphenyl)-2H-benzotriazole and 2-(2-hydroxy-5-tert-octylphenyl)-2H-benzotriazole. Preferred examples of the blueing agent include anthraquinone-based compounds.

When the composition for optical materials of the present invention is easily released from the mold during polymerization, it is possible to use or add a publicly-known external and/or internal adhesiveness improving agent to control and improve the adhesiveness between a cured product obtained and the mold. Examples of the adhesiveness improving agent include publicly-known silane coupling agents and titanate compounds, and such substances may be used solely, or two or more of them may be used in combination. The amount of the adhesiveness improving agent to be added is usually 0.0001 to 5% by mass relative to the total amount of the composition for optical materials. Conversely, when the composition for optical materials of the present invention is not easily released from the mold after polymerization, it is possible to use or add a publicly-known external and/or internal mold release agent to improve the ability of a cured product obtained to be released from the mold. Examples of the mold release agent include fluorine-based non-ionic surfactants, silicon-based non-ionic surfactants, phosphate esters, acidic phosphate esters, oxyalkylene-type acidic phosphate esters, alkali metal salts of acidic phosphate esters, alkali metal salts of oxyalkylene-type acidic phosphate esters, alkali metal salts of higher fatty acids, higher fatty acid esters, paraffin, wax, higher aliphatic amides, higher aliphatic alcohols, polysiloxanes and aliphatic amine ethylene oxide adducts. These substances may be used solely, or two or more of them may be used in combination. The amount of the mold release agent to be added is usually 0.0001 to 5% by mass relative to the composition for optical materials.

The method for producing an optical material by polymerizing and curing the composition for optical materials of the present invention will be described in more detail below. All of the aforementioned respective components of the composition and additives such as antioxidant, ultraviolet absorber, polymerization catalyst, radical polymerization initiator, adhesiveness improving agent and mold release agent may be mixed together simultaneously in the same container with stirring. Alternatively, respective raw materials may be added and mixed in a stepwise manner. Alternatively, respective several components may be separately mixed and then mixed again in the same container. Raw materials and auxiliary materials may be mixed in any order. The temperature to be set for mixing, the time required for mixing, etc. are basically not limited as long as respective components can be sufficiently mixed.

The composition for optical materials after the above-described reaction and treatment is injected into a mold made of glass or metal, and a polymerization and curing reaction is promoted by heating or irradiation with active energy ray such as ultraviolet light, and after that, a product obtained is released from the mold. The optical material is produced in this way. The composition for optical materials is preferably polymerized and cured by heating to produce an optical material. In this case, the curing time is 0.1 to 200 hours, usually 1 to 100 hours, and the curing temperature is −10 to 160° C., usually −10 to 140° C. The polymerization may be conducted by carrying out a step of holding the composition at a predetermined polymerization temperature for a predetermined amount of time, a step of increasing the temperature at a rate of 0.1° C. to 100° C./h and a step of decreasing the temperature at a rate of 0.1° C. to 100° C./h, or a combination of these steps. Further, in the method for producing the optical material of the present invention, it is preferred to anneal the cured product at a temperature of 50 to 150° C. for about 10 minutes to 5 hours after the completion of the polymerization in terms of eliminating distortion of the optical material. Moreover, a surface treatment such as dyeing, hard coating, impact-resistant coating, antireflection treatment and imparting antifog properties can be performed according to need.

The viscosity of the composition for optical materials of the present invention, which is measured using a vibration-type viscometer after stirring components homogeneously and then keeping the mixture at 20° C. for 3 hours, is preferably less than 450 cp, and more preferably less than 350 cp.

Further, when the composition for optical materials of the present invention is polymerized and cured, and then subjected to a 48-hour weathering test to measure the change in color tone, ΔY.I. is preferably less than 3.5, and more preferably less than 2.5.

EXAMPLES

Hereinafter, the present invention will be specifically described by way of examples, but the present invention is not limited thereto. Note that evaluation was made according to the below-described methods.

To compounds (compound (a), sulfur and polythiol compound) shown in Tables 3 and 4 below, triethylbenzyl ammonium chloride as the polymerization catalyst (b) in an amount of 0.03% by mass relative to the total amount of composition for optical materials, and a stabilizer shown in Tables 3 and 4 in an amount of 0.3% by mass relative to the total amount of composition for optical materials were added, the mixture was stirred homogeneously and then kept at 20° C. for 3 hours, and the viscosity thereof was measured using a vibration-type viscometer (VM-10A manufactured by Sekonic Corporation). Specifically, about 30 mL of the solution was put in a 100 mL plastic container, it was allowed to stand in a furnace at 20° C., and the viscosity was measured. The results based on the evaluation criteria shown in Table 1 below are shown in Tables 3 and 4.

TABLE 1

| Evaluation | Viscosity (cP) |
|---|---|
| A | <350 |
| B | 350 to 450 |
| C | >450 |

To compounds (compound (a), sulfur and polythiol compound) shown in Tables 3 and 4 below, triethylbenzyl ammonium chloride as the polymerization catalyst (b) in an amount of 0.03% by mass relative to the total amount of composition for optical materials, and a stabilizer shown in Tables 3 and 4 in an amount of 0.3% by mass relative to the total amount of composition for optical materials were added, and the mixture was polymerized and cured. Using a weathering test apparatus (Weather-Ometer Ci4000 manufactured by ATLAS), a 48-hour weathering test was conducted at a black panel temperature of 60° C. and at a humidity of 50%, and the change in color tone before and after the weathering test (degree of yellowness ($\Delta Y.I.$)) was measured using a spectrophotometric colorimeter CM-5 manufactured by Konica Minolta, Inc. Specifically, Y.I. of a sample (t=5 mm) was measured at 25° C. in advance, the sample was subjected to the above-described weathering test, and after the sample was left in a room at 25° C. for 30 minutes or more, Y.I. of the sample was measured again. Further, the difference in Y.I. before and after the weathering test was defined as $\Delta Y.I.$ The results based on the evaluation criteria shown in Table 2 below are shown in Tables 3 and 4.

TABLE 2

| Evaluation | $\Delta Y.I.$ |
|---|---|
| A | <2.5 |
| B | 2.5 to 3.5 |
| C | >3.5 |

TABLE 3

| Examples | Compounds (weight ratio) | Stabilizer | Viscosity (3 hours later) | Weather resistance |
|---|---|---|---|---|
| 1 | BES/S/BMES = 79/14/7 | Dimethyl chloromalonate | A | A |
| 2 | BES/S/BMES = 79/14/7 | Diethyl chloromalonate | A | A |
| 3 | BES/S/BMES = 79/14/7 | Dimethyl bromomalonate | B | A |
| 4 | BES/S/BMES = 79/14/7 | Diethyl bromomalonate | B | A |

Compound abbreviations
BES: bis(β-epithiopropyl)sulfide
S: sulfur
BMES: bis(2-mercaptoethyl)sulfide

TABLE 4

| Comparative Examples | Compounds (weight ratio) | Stabilizer | Viscosity (3 hours later) | Weather resistance |
|---|---|---|---|---|
| 1 | BES/S/BMES = 79/14/7 | Dibutyltin dichloride | A | C |
| 2 | BES/S/BMES = 79/14/7 | Butyltin trichloride | A | C |
| 3 | BES/S/BMES = 79/14/7 | Dimethyldichlorosilane | C | A |
| 4 | BES/S/BMES = 79/14/7 | Triethylchlorosilane | C | B |

Compound abbreviations
BES: bis(β-epithiopropyl)sulfide
S: sulfur
BMES: bis(2-mercaptoethyl)sulfide

The invention claimed is:

1. A composition for optical materials containing an episulfide compound (a), a polymerization catalyst (b), and an ester compound having a halogen at α position (c), wherein the ester compound having a halogen at α position (c) is a compound represented by formula (10):

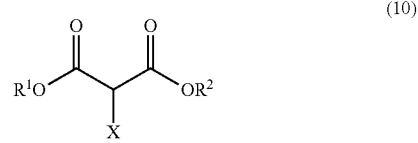

(10)

wherein: X represents a halogen; and $R^1$ and $R^2$ each independently represents a hydrocarbon having 1 to 10 carbon atoms.

2. The composition for optical materials according to claim 1, wherein the episulfide compound (a) is a compound represented by formula (1):

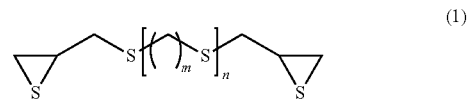

(1)

wherein: m represents an integer of 0 to 4; and n represents an integer of 0 to 2.

3. The composition for optical materials according to claim 1, which further comprises a polythiol compound.

4. The composition for optical materials according to claim 1, which further comprises sulfur and/or a compound represented by formula (9):

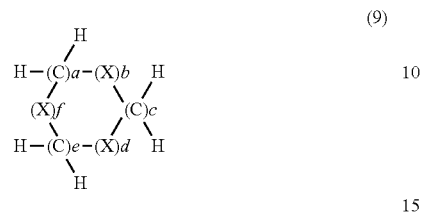

(9)

wherein: X represents S, Se or Te; a to f=0 to 3; $8 \geq (a+c+e) \geq 1$; $8 \geq (b+d+f) \geq 2$; and $(b+d+f) \geq (a+c+e)$.

5. The composition for optical materials according to claim 1, wherein the compound represented by formula (10) is at least one compound selected from the group consisting of dimethyl chloromalonate, diethyl chloromalonate, dimethyl bromomalonate and diethyl bromomalonate.

6. An optical material obtained by polymerizing the composition for optical materials according to claim 1.

7. The composition for optical materials according to claim 4, which comprises sulfur.

* * * * *